No. 611,865. Patented Oct. 4, 1898.
P. J. PARKER.
BICYCLE.
(Application filed Apr. 20, 1897.)
(No Model.)

WITNESSES

INVENTOR
P. J. Parker.
BY
ATTORNEYS.

THE NORRIS PETERS CO., PHOTO-LITHO., WASHINGTON, D. C.

UNITED STATES PATENT OFFICE.

PHILIP JOHN PARKER, OF NEW YORK, N. Y.

BICYCLE.

SPECIFICATION forming part of Letters Patent No. 611,865, dated October 4, 1898.

Application filed April 20, 1897. Serial No. 632,964. (No model.)

*To all whom it may concern:*

Be it known that I, PHILIP JOHN PARKER, of New York, (Brooklyn,) in the county of Kings and State of New York, have invented a new and Improved Bicycle, of which the following is a full, clear, and exact description.

This invention relates particularly to that class of bicycles termed "chainless;" and the object is to provide a wheel of this character in which the friction is reduced to a minimum and in which the driving power is directed from the center of the pedal-shaft, thereby securing the greatest amount of power by a comparatively small pressure, and therefore allowing for a gear of larger size than is possible in chainless wheels in which the driving gear-wheel is located at one side of the frame.

I will describe a bicycle embodying my invention and then point out the novel features in the appended claims.

Reference is to be had to the accompanying drawings, forming a part of this specification, in which similar characters of reference indicate corresponding parts in all the views.

Figure 1:
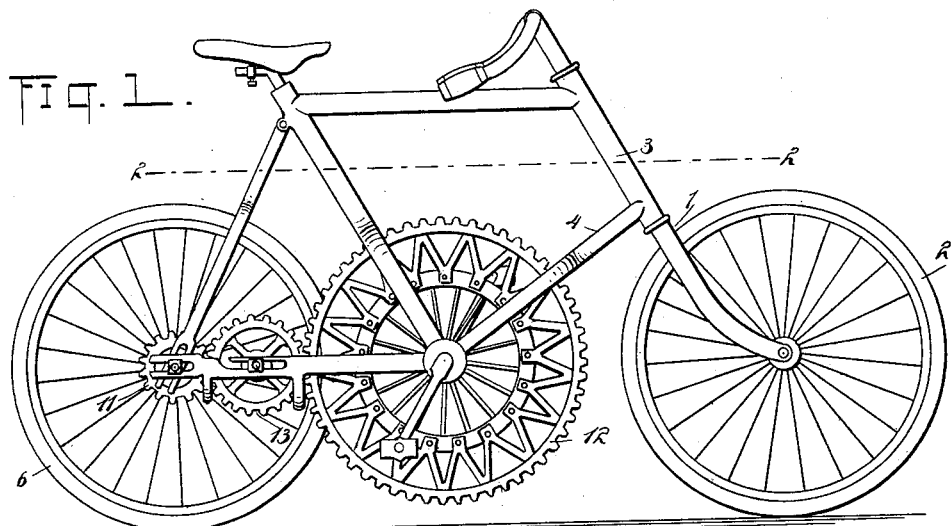
Figure 2:
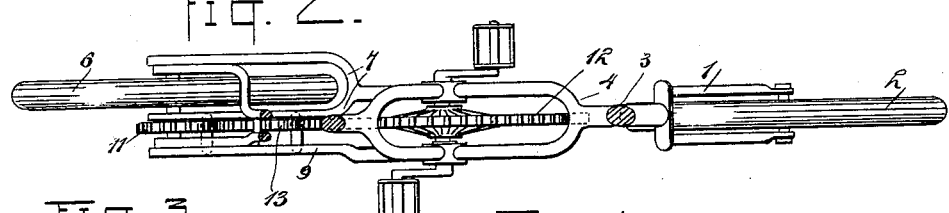
Figures 3, 4:
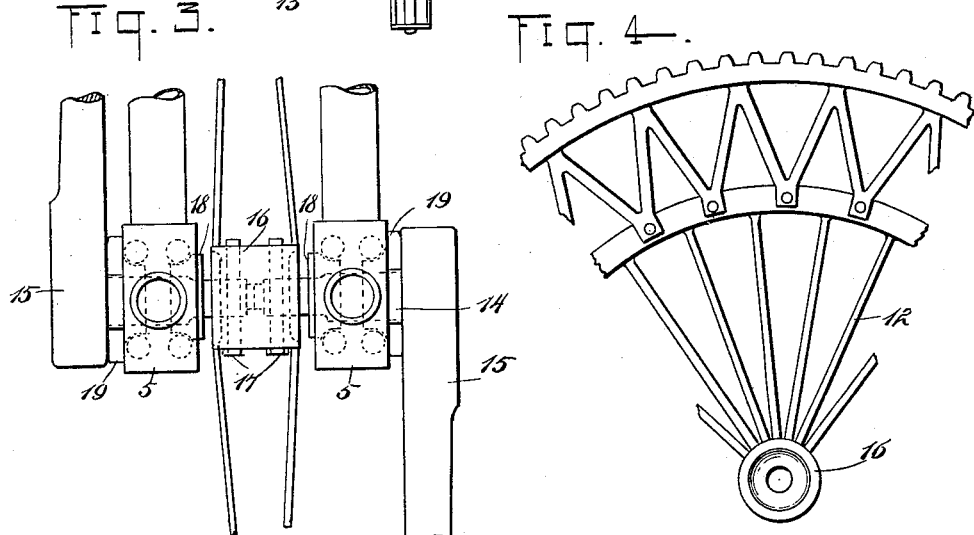
Figure 5:
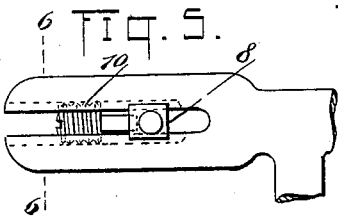
Figure 6:
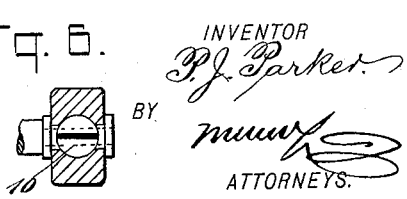

Figure 1 is a side elevation of a bicycle embodying my invention. Fig. 2 is a plan view and section through the frame on the line 2 2 of Fig. 1. Fig. 3 is an elevation drawn on an enlarged scale showing the arrangement of the cranks and crank-hangers. Fig. 4 is a side elevation of a portion of the driving-gear. Fig. 5 is a detail showing an adjusting means for the rear wheel, and Fig. 6 is a section on the line 6 6 of Fig. 5.

The bicycle comprises a frame having the usual front fork 1, in which the front wheel 2 is mounted, and extended rearward and downward from the front bar 3 of the frame is a forked member 4, connecting the crank-hangers 5. The rear wheel 6 has its shaft-bearings in the frame members 7 extended rearward from and supported by the hangers 5. It will be seen that these frame members 7 are arranged laterally of the front fork 1, so that the rear wheel and the front wheel are in different planes—that is, the rear wheel will be arranged in a line at one side of the front wheel. This disposition of the wheels not only provides for a comparatively broad tread of the two wheels of the bicycle, but it allows for the central disposition of the driving-gear to be hereinafter explained.

The axle of the rear wheel 6 has its bearings in blocks 8 movable in guideways on the rearwardly-extended portions 7 and 9 of the frame. These blocks 8, may be forced forward and held as adjusted by means of screws 10, engaging in threaded portions of the fingers attached to the parts 7 and 9. A gear-wheel 11 is mounted on the shaft of the rear wheel 6, and this gear-wheel 11 has connection with a large driving gear-wheel 12, as here shown, through an intermediate gear 13, having its shaft-bearings in boxes movable in slots formed in the rearwardly-extended portions 7 and 9 of the frame. These slots in the portions 7 and 9 of the frame have outward openings, so that the gear-wheels may be easily removed, if desired.

The driving gear-wheel 12 is rigidly mounted on the crank-shaft 14, having bearings in the hangers 5. It will be seen that the gears 11, 12, and 13 are in a direct line with the front wheel 2, so that when pressure is applied to the cranks 15 the said pressure will be evenly or centrally distributed. As here shown, the pedal-shaft 14 consists of two sections connected, respectively, to the cranks 15. The portions of the shaft extended into the hub 16 of the driving-gear are reduced in diameter and are rigidly held therein by means of keys 17, passing through openings in the hub and also through openings in the shaft 14. The ends of the hub 16 will have depressions to allow room for the movement of the cone-bearings 18 when it is desired to release the cone-bearings from the hangers 5. Cone-bearings 19 will also be provided for the shaft at the outer sides of the hangers. By this construction it is obvious that the driving-wheel may be easily removed or inserted when desired.

Certain advantages of my invention over others in which the driving-gear is at one side of the center are, first, a direct driving power, which is only possible by having the driving-wheel in the center of the axle or crank-hanger, thereby equalizing the strain on the two sides of the bicycle-frame; second, by having the driving-gear in the center it enables a person to use a much larger driving-gear than is possible with the present style, because it is entirely out of the way, and therefore not liable to catch on the clothing of a rider, and, third, by having the rear wheel at one side of a line drawn from the front wheel it allows for the use of three gear-wheels, the least number that can be used, thereby reducing the friction.

Having thus described my invention, I claim as new and desire to secure by Letters Patent—

1. In a bicycle, a frame comprising a forked member extended rearward and downward from the front bar, a crank-hanger section on each member of the fork, a crank-shaft in the hangers, a driving-gear on the shaft between the hangers, and in line with the front wheel of the bicycle, laterally-offset frame members extended rearward from one of the hangers, a rear wheel having shaft-bearings between said offset frame members, a substantially straight frame member extended rearward from the other hanger, a pinion on the rear-wheel shaft, and a gear-wheel connecting said pinion with the gear-wheel on the crank-shaft, said rear-wheel pinion and connecting-gear having shaft-bearings in the straight frame member on one side, and in the adjacent member of the offset members on the other side, substantially as specified.

2. In a bicycle, a frame having guide-slots in its rear end, the said guide-slots opening outward and having their opposite walls screw-threaded, journal-boxes in said slots and screws engaging the threads of the opposite walls and with the boxes, substantially as specified.

PHILIP JOHN PARKER.

Witnesses:
PRESTON R. MOODY,
WM. F. MOSELEY.